Aug. 10, 1965    H. W. THOMPSON    3,200,315
ELECTRIC MOTOR SYSTEM
Filed Sept. 11, 1961    2 Sheets-Sheet 1
FIG. 1.
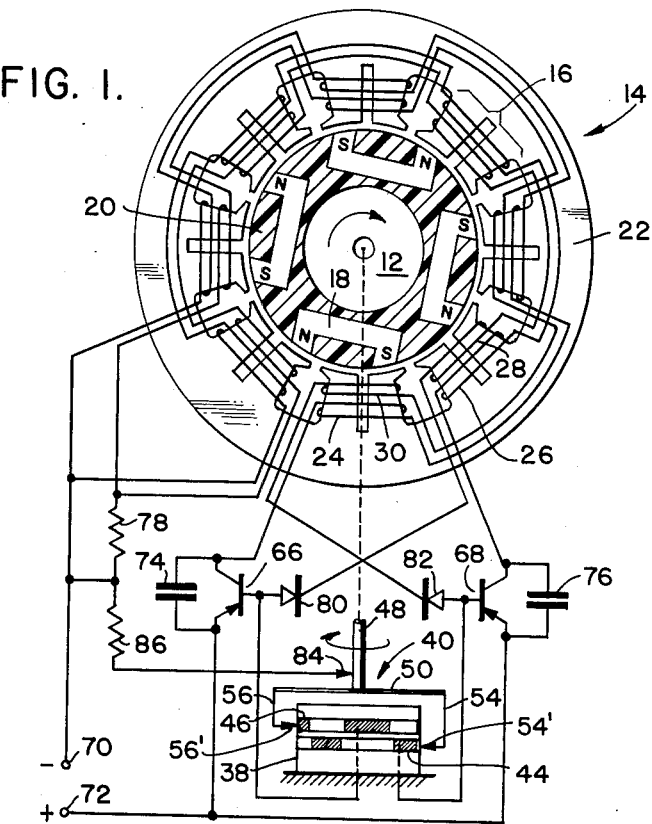
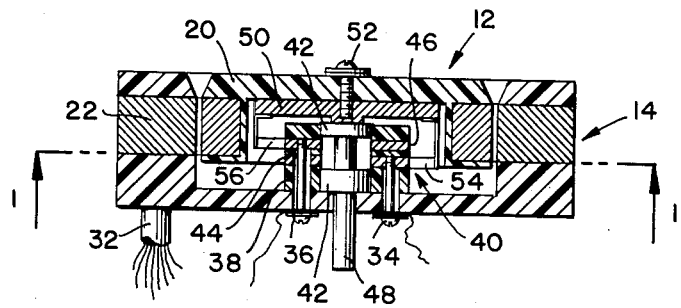
FIG. 2.
INVENTOR.
HAROLD W. THOMPSON
BY
*V.C. Mueller*
ATTORNEY.

Aug. 10, 1965　　　H. W. THOMPSON　　　3,200,315
ELECTRIC MOTOR SYSTEM
Filed Sept. 11, 1961　　　　　　　　　　　　　　2 Sheets-Sheet 2

INVENTOR.
HAROLD W. THOMPSON
BY
　J.C. Muller
ATTORNEY.

United States Patent Office 3,200,315
Patented Aug. 10, 1965

3,200,315
ELECTRIC MOTOR SYSTEM
Harold W. Thompson, Pasadena, Calif., assignor to the United States of America as represented by the Secretary of the Navy
Filed Sept. 11, 1961, Ser. No. 137,445
3 Claims. (Cl. 318—138)
(Granted under Title 35, U.S. Code (1952), sec. 266)

The invention described herein may be manufactured and used by or for the Government of the United States of America for governmental purposes without the payment of any royalties thereon or therefor.

This invention relates to electrical motors and more particularly to D.C.-energized motor systems employing brushless-type motors.

The motor system described herein is intended for use in any equipment wherein it is desirable that a motor be energized by a battery or other source of D.C. power, that the motor shall run at a predetermined speed with excellent regulation, and that the motor system shall not give rise to noise interference in adjacent or associated electronic apparatus. By way of example as to environment in which the invention finds application, motor systems having the foregoing characteristics are advantageously employed to drive film-type recorders, as used in exercise sections of acoustic-homing torpedoes during underwater test runs thereof, such torpedoes having sensitive electro-acoustic receiver apparatus which would be easily disturbed by electrical noise arising from conventional D.C.-energized motors. In such torpedo application, recorder drive systems ordinarily employ motors of universal A.C.-D.C. type, with a speed-controlling circuit including a switch forming part of and operated by a governor device coupled to the motor. While presenting generally satisfactory operating characteristics in some instances, such prior art motor systems tend to generate electrical noise interference of magnitude and character which cannot be tolerated in acoustic-homing torpedo apparatus and which cannot be adequately suppressed or filtered by conventional techniques.

It is therefore an object of the present invention to provide an improved D.C.-energized brushless-motor system.

It is another object of the invention to provide a D.C.-energized brushless-motor system having novel motor structure and associated control apparatus which effect unidirectional self-starting.

It is a further object of the invention to provide an improved adjustable-speed D.C.-energized brushless-motor system.

Other objects and attendant advantages of this invention will be readily appreciated as the same becomes better understood by reference to the following detailed description when considered in connection with the accompanying drawing wherein:

FIG. 1 illustrates diagrammatically a D.C.-energized brushless-motor system embodying the present invention, the motor therein being shown partly in sectional plan view taken along line 1—1 of FIG. 2 to illustrate rotor and stator pole and winding configurations;

FIG. 2 is a cross-sectional view of the motor taken in a plane through the rotor axis, illustrating the structure and self-contained arrangement of a rotary centrifugal-release starting switch;

In accordance with the present invention there is provided a motor having a permanently-magnetized rotor, a specially wound stator, and a pair of power-type transistors which, in an oscillatory circuit including the stator windings and powered from a D.C.-source, serve to run the motor at a synchronous speed corresponding to the operating frequency of the oscillatory circuit and the number of pairs of rotor or stator poles. Further in accordance with the present invention, the motor is made unidirectionally self-starting by use of a bifurcated stator pole configuration, a multiple-contact centrifugal-release switch and a pair of diodes, which effect application of starting currents to the stator pole windings and further in a manner which prevents oscillator action from being disturbed during the motor-start period.

Figure 3:
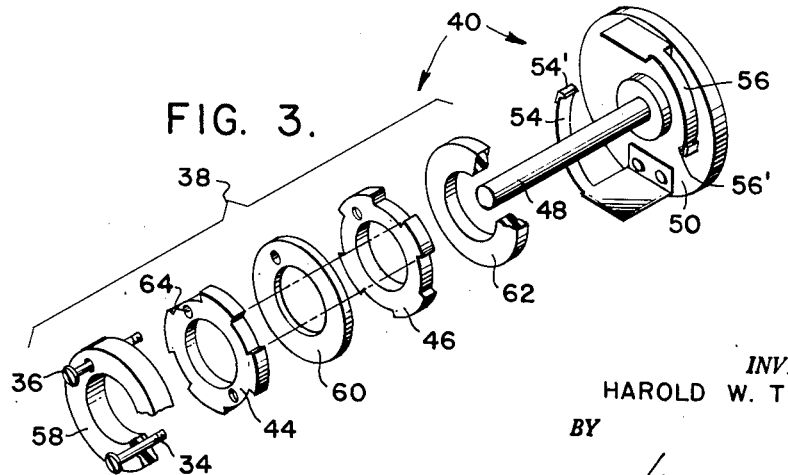
FIG. 3 is an exploded view clarifying the starting-switch structure.

In greater detail, referring first to FIGS. 1 and 2, rotor 12 and stator 14 are in this exemplary embodiment each provided with four pairs of poles, each stator pole 16 being bifurcated to present a pair of circumferentially-spaced pole faces for reasons which will appear. Rotor 12 is of permanently-magnetized type, in this instance provided by encapsulation of magnets 18 in say a thermoset resin 20 of epoxy type, cast in shallow cup-shaped form. Field structure 22 and its four windings or series of coils 24, 26, 28 and 30 are similarly encapsulated in an epoxy resin casting of cup-shaped configuration to provide the stator 14. End leads of the several series of coils are grouped and sleeved to form the emerging cable 32. The field structure 22 may of course be built up of sheet steel stampings or laminations as in conventional motor practice. Secured to stator 14 by means of bolts 34, 36 as detailed in FIG. 2, the tubular member 38 forms part of a centrifugal-release motor-starting switch 40 and further serves to house conventional bearings 42 by press-fit. Bolts 34, 36 also serve as connection terminals for the switch plates 44, 46 of the tubular member 38. Motor shaft 48, retained by press-fit in the bearings 42, terminates in an electrically conductive plate member 50 which is secured to rotor 12 by a bolt 52 as shown. Best understood from the exploded view of the motor-starting switch 40 as shown in FIG. 3, arm members 54 and 56, conductively secured to and extending from the plate member 50, carry weighted starting-switch contacts 54' and 56' which, until withdrawn by development of sufficient centrifugal force very soon after motor energization, are urged in this instance by leaf spring effect of the arm members themselves against the tubular member 38 in position to make wiping engagement against the salient contact faces presented by the toothed switch plates 44, 46.

Tubular member 38 in this embodiment is provided as a casting in which the switch plates 44, 46 are insulatingly spaced in epoxy resin material. For ease of illustrating and clarifying the toothed configuration and relative arrangement of the switch plates 44 and 46, FIG. 3 provides a simplified exploded view wherein the toothed switch plates appear laminated between spacing and insulating rings 58, 60 and 62, but it will be understood that the epoxy resin material also extends into the intertooth regions of each switch plate to bind the switch plates into a unitary tubular structure having a smooth peripheral surface. Bolt 34 threads into and thus makes connection with switch plate 44; bolt 36 threads into and makes connection only with switch plate 46, clearing switch plate 44 because of the enlarged hole 64 therein, or otherwise insulated from switch plate 44 by any suitable means.

Exemplary circuitry of the D.C.-energized motor system is shown in FIG. 1, wherein the starting switch 40 and its association with the motor are illustrated diagrammatically. Transistors 66, 68 are in this instance shown as being of PNP-type and employed in a common-emitter push-pull type of oscillator circuit, energized by application of voltage from any suitable D.C. source to terminals 70, 72 with polarities as indicated. The so-called tank circuit of the oscillator is formed by the capacitors 74, 76 in association with the two series of stator coils 24 and 26 which are hereinafter termed driving coils. The remaining two series of coils 28 and 30 serve to provide feedback as required for oscillator action. The two series of driving coils 24, 26 are separately excited via the collector-electrodes of transistors 66 and 68, respectively. Current paths for the feedback coils 28 and 30, in the oscillator circuit, are completed via the emitter and base electrodes of transistors 66 and 68, respectively, via diodes 80 and 82, respectively, and via the limiting resistor 78 leading to the negative terminal 70. The diodes 80 and 82, not normally employed in oscillator circuits in the disclosed arrangement, serve in the starting-switch circuit during the motor-start period to enable proper motor-start action, without affecting oscillator characteristics. Indicated schematically in FIG. 1, connection to the starting-switch contacts 54', 56' may be provided simply by means of a wiping contact 84 bearing against the shaft 48, this circuit carrying only the comparatively small emitter-to-base currents of the transistors.

Self-starting action is initiated upon application of voltage to the terminals 70 and 72, and such action is effected by communication of negative biasing potentials, via the starting resistor 86 and starting-switch 40, to the base-electrodes of the transistors in alternating sequence and at instants related to angular displacement of rotor 12 as will appear. Under control of the negative potentials sequentially applied by the starting-switch 40 to the transistor 66, 68 base electrodes, during motor-start action, the two series of driving coils 24, 26 are correspondingly sequentially energized with resultant development of motor-starting and accelerating torques which effect centrifugal release of the starting-switch contacts, at which time the motor comes under full control of the oscillator circuit. The starting action, further, is unidirectional by virtue of the described magnetic structure configuration wherein the stator poles are bifurcated. When at rest, each rotor pole is in alignment with one or the other of the pair of faces presented by the opposing stator pole. Upon energization of one of the series of driving coils under control of the transistors and through action of starting-switch 40, each stator pole becomes magnetically polarized in such sense as to effect motor starting in a predetermined direction. Starting-switch 40 is so oriented relative to the rotor poles that switchover of transistor control is effected at about the position and instant of rotor pole alignment with stator pole bifurcation slots. In the particular arrangement and condition illustrated in FIG. 1, contact 56' of starting-switch 40 is in engagement against a contact face of switch plate 46, thus controlling transistor 66 to energize the series of driving coils 24, resulting in unlike polarization of the opposed stator poles and producing motor torque which effects the rotation direction indicated in FIG. 1. With the rotor now in motion and approaching rotor pole alignment with the other stator pole faces, switchover action of the starting-switch 40 occurs at about the instant at which the rotor poles oppose the bifurcation slots. This switchover action causes de-energization of driving coils 24 by removal of negative bias from the transistor 66 base-electrode, and energization of the series of driving coils 26 by application of negative bias to the transistor 68 base-electrode through engagement of starting-switch contact 54' against a contact face of switch plate 44, resulting in like polarization of the opposed stator poles which, for the new rotor orientation, produces motor torque of the same sense and accelerates the rotor in the same angular direction. Such switchover and unidirectional torque action continues and quickly brings the motor starting-switch to centrifugal-release speed and thus under speed control of the oscillator circuit.

It will be recognized that while the D.C.-energized brushless-motor system as thus far described with reference to FIGS. 1, 2 and 3 operates at a fixed speed, the speed is of course a function of oscillator frequency which is readily set to a desired value simply by suitable choice of the microfarad value of capacitors 74, 76. Speed adjustability can of course otherwise easily be provided by use of several capacitors which may be selectively inserted in circuit by any suitable switching arrangement.

Figure 4:
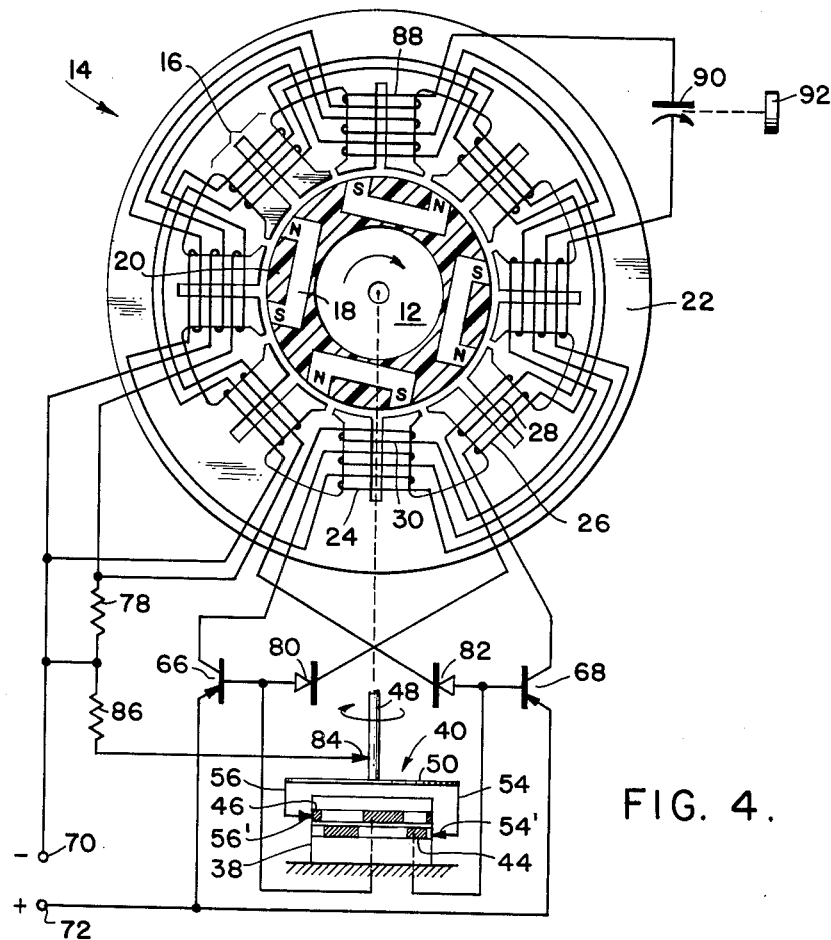
FIG. 4 illustrates schematically a modification of the FIG. 1 D.C.-energized motor system, providing for continuously-variable adjustment of the motor speed.

Oscillator frequency and correspondingly motor speed can also be made continuously adjustable by use of a transformer-coupled LC circuit as in the modification illustrated in FIG. 4, physically similar to the FIG. 1 embodiment except for omission of capacitors 74 and 76, and addition of a series of tertiary coils 88 shunted by variable capacitor 90 which is controllable by a knob or dial 92. While a coil series in the described motor system may be wound about successive poles of the stator, with winding reversal as necessary between poles, tertiary coils 88 in this instance are shown as wound about alternate poles of the stator, this being quite satisfactory (as in the case of each of the series of driving coils 24 and 26, and each of the series of feedback coils 28 and 30) since the magnetic circuits are completed through adjacent stator poles which therefore also become polarized upon coil energization.

It will be understood that various other modifications may be introduced with respect to the configuration and construction of the brushless-motor and the centrifugal-release starting-switch, and with respect to circuitry and frequency control of the oscillator, without departing from principles of the present invention. For example, since analysis of the oscillator circuit shown in FIG. 1 indicates that capacitors 74, 76 are effectively series-connected, a single capacitor may be substituted therefor, connecting between the collector-electrodes of transistors 66, 68. Similarly, such capacitor and connection may also be employed in the FIG. 4 embodiment, the auxiliary LC circuit there shown then serving to provide fine control over motor speed. Again, it will be apparent to those skilled in the art that transistors of other than PNP-type, and push-pull oscillators of other than common-emitter type, may readily be employed without constituting departures from the essence of the invention.

It will also be understood that while the described embodiments of the invention employ permanently magnetized rotors to provide synchronous motor characteristics, the invention is also applicable to motors of induction type.

Obviously other modifications, variations and applications of the present invention are possible in the light of the above teachings. It is therefore to be understood that within the scope of the appended claims the invention may be practiced otherwise than as specifically described herein.

What is claimed is:

1. A self-starting motor system comprising, in combination: an electrical motor including a rotor and a stator having poles defined therein, said rotor poles being magnetized in fixed sense; two separately-energizable series of driving coils for reversible magnetic polarization of the stator poles; each said stator pole being bifurcated to present a pair of circumferentially-spaced pole faces; a D.C.-energized oscillator circuit for providing driving currents in said two series of coils at the frequency of oscillator operation, said oscillator circuit including said two series of coils, and said oscillator energizing said two series of driving coils alternately to reverse the magnetic polarization of said stator poles; and circuit means, including a centrifugal switch device driven by said rotor, operative only during a motor-start period, for sequentially applying starting currents to said two series of coils, said device switching application of starting current from one of said two series of coils to the other of said two series of coils at instants when a rotor pole is positioned substantially midway between a pair of spaced pole faces of a stator pole.

2. A self-starting motor system comprising, in combination: an electrical motor including a rotor and a stator having poles defined therein, said rotor poles being magnetized in fixed sense; separately-energizable first and second series of driving coils wound, respectively, about first and second series of alternate poles of said stator, for reversible magnetic polarization of the stator poles; each said stator pole being bifurcated to present a pair of circumferentially-spaced pole faces; a D.C.-energized oscillator circuit for providing driving currents in said first and second series of coils at the frequency of oscillator operation, said oscillator circuit including said first and second series of coils, and said oscillator energizing said two series of driving coils alternately to reverse the magnetic polarization of said stator poles; and circuit means, including a centrifugal switch device driven by said rotor, operative only during a motor-start period, for sequentially applying starting currents to said first and second series of coils, said device switching application of said starting currents at instants when a rotor pole is positioned substantially midway between a pair of spaced pole faces of a stator pole.

3. A self-starting motor system comprising, in combination: an electrical motor including a rotor and a stator having poles defined therein, said rotor poles being magnetized in fixed sense; separately-energizable first and second series of driving coils wound, respectively, about first and second series of alternate poles of said stator, for reversible magnetic polarization of the stator poles; each said stator pole being bifurcated to present a pair of circumferentially-spaced pole faces; a D.C.-energized oscillator circuit for providing driving currents in said first and second series of coils at the frequency of oscillator operation, said oscillator circuit including said first and second series of coils and active electronic means operating to provide oscillator action, and said oscillator energizing said two series of driving coils alternately to reverse the magnetic polarization of said stator poles; said active electronic means having a pair of sensitive control electrodes and further operating to provide unidirectional starting currents in said coils in response to control voltages applied to said electrodes; and circuit means, including a centrifugal switch device driven by said rotor, operative only during a motor-start period, for sequentially applying said control voltages to said electrodes, said device switching application of said control voltages at instants when a rotor pole is positioned substantially midway between a pair of spaced pole faces of a stator pole.

References Cited by the Examiner

UNITED STATES PATENTS

| 2,624,814 | 1/53 | Shewon | 300—80 |
| 2,683,228 | 7/54 | Schaefer | 310—69 |
| 2,821,675 | 1/58 | Ostenso | 318—138 X |
| 2,994,023 | 7/61 | Devol | 318—138 |
| 2,995,690 | 8/61 | Lemon | 318—138 |
| 3,124,733 | 3/64 | Andrews | 318—138 |

ORIS L. RADER, *Primary Examiner.*

JOHN F. COUCH, *Examiner.*